United States Patent [19]
Huang et al.

[11] Patent Number: 6,092,137
[45] Date of Patent: Jul. 18, 2000

[54] FAIR DATA BUS ARBITRATION SYSTEM WHICH ASSIGNS ADJUSTABLE PRIORITY VALUES TO COMPETING SOURCES

[75] Inventors: Paul Huang, Taipei; Huan-Pin Tseng, Hsin-Chu; Yao-Tzung Wang, Hsin-Chu; Tai-Chung Chang, Hsin-Chu; Kuo-Yen Fan, NanTou Hsien, all of Taiwan

[73] Assignee: Industrial Technology Research Institute, Hsinchu, Taiwan

[21] Appl. No.: 08/978,580

[22] Filed: Nov. 26, 1997

[51] Int. Cl.$^7$ ..................................................... G06F 13/00
[52] U.S. Cl. ........................... 710/111; 710/107; 710/113; 710/40; 710/36; 710/42; 710/116; 710/123; 710/240; 710/241; 710/242; 710/244; 711/150
[58] Field of Search ..................................... 710/111, 107, 710/113, 40, 36, 42, 116, 123, 240, 241, 242, 244; 711/150

[56] References Cited

U.S. PATENT DOCUMENTS

| | | | |
|---|---|---|---|
| 4,481,583 | 11/1984 | Mueller | 710/107 |
| 4,672,536 | 6/1987 | Giroir et al. | 710/107 |
| 4,901,234 | 2/1990 | Heath et al. | 710/107 |
| 5,088,024 | 2/1992 | Vernon et al. | |
| 5,168,568 | 12/1992 | Thayer et al. | 710/125 |
| 5,261,109 | 11/1993 | Cadambi et al. | |
| 5,265,223 | 11/1993 | Brockmann et al. | |
| 5,276,899 | 1/1994 | Neches | 709/240 |
| 5,349,690 | 9/1994 | Frame et al. | |
| 5,392,033 | 2/1995 | Oman et al. | |
| 5,430,848 | 7/1995 | Waggener | 710/107 |
| 5,450,591 | 9/1995 | Palmer | 710/113 |
| 5,485,586 | 1/1996 | Brash et al. | |
| 5,509,125 | 4/1996 | Johnson et al. | |
| 5,519,837 | 5/1996 | Tran | |
| 5,560,016 | 9/1996 | Fiebrich et al. | 710/240 |
| 5,581,782 | 12/1996 | Sarangdhar et al. | |
| 5,590,299 | 12/1996 | Bennett | |
| 5,809,278 | 9/1998 | Watanabe | 711/150 |
| 5,881,313 | 3/1999 | Ramakrishnan et al. | 710/40 |

*Primary Examiner*—Ayaz R. Sheikh
*Assistant Examiner*—Frantz Blanchard Jean

[57] ABSTRACT

A scheme for arbitrating access to a data bus shared among a plurality of competing sources is provided. Each competing source is assigned an adjustable priority weighting value (PWV) which is initially set to an initial value based on the bandwidth requirements of the competing source. During arbitration, the PWVs of those competing sources requesting access to the bus are compared, and the competing source with the smallest PWV is granted access. The PWV of the competing source which was granted access to the bus is reset to its initial value and the PWV of each competing source which requested, but was denied, access is reduced by one for subsequent comparisons. The arbitration scheme of the present invention is further applied to two-level arbitration. Each competing source is classified into a competing source group, and the requests from the grouped competing sources are processed by first level arbitration. First level arbitration passes one competing source for each group to a second level arbiter. The second level arbiter compares the PWVs of the competing sources resulting from first level arbitration to determine the competing source with the smallest PWV, and adjusts the PWVs after access to the bus has been granted.

16 Claims, 7 Drawing Sheets

- BUS SERVICE TIME FOR A SDTU: $T_o$
- $CS_i$ SHORTEST REQUEST INTERVAL FOR A SDTU: $T_i$
- INITIAL $PWV_i$ = INTEGER ($T_i/T_o$)

FAIR DATA BUS ARBITRATION SYSTEM WHICH ASSIGNS ADJUSTABLE PRIORITY VALUES TO COMPETING SOURCES

FIELD OF THE INVENTION

The present invention relates to a scheme for arbitrating access to a resource, such as a data bus, which is shared among a plurality of sources.

BACKGROUND OF THE INVENTION

In data processing systems in which more than one source (competing sources) require access to a shared data bus, for example in local area networks (LANs), an arbitration scheme is required to control data traffic over the bus. Because only one source can gain access to the bus at a time, an arbitration protocol must be implemented to determine which of a plurality of sources requesting bus access is allowed to access the shared bus.

The arbitration scheme selected, however, generally involves a trade off between two competing factors, fairness and efficiency. A fair arbiter ensures that all competing sources, even those with relatively low priority, are not totally blocked from accessing the bus or denied access to the bus for unreasonably long periods of time. An arbiter which enables efficient use of the data bus may allow competing sources with higher priority to gain disproportionate access to the bus.

An example of an arbitration scheme which provides fair access to a shared data bus is round robin arbitration. In a round robin arbiter, competing sources are sequentially granted access to the bus. After a source has been granted bus access, it will not again be awarded bus access until all remaining access requests have been granted. The round robin arbiter enables each competing source to have temporary priority over other competing sources, thereby ensuring that all sources have an opportunity to access the bus. Another example of a fair arbitration protocol is first-come first-serve arbitration, in which competing sources are granted bus access in the same order in which they request bus access.

An arbitration scheme which ensures fair access to the shared data bus, however, may result in inefficient use of the bus. Often, it may be desirable for a high priority source to gain disproportionate access to the data bus. For example, certain sources may be faced with time constraints which require that they transmit data within a set period of time, and therefore efficient use of the data bus requires that these sources be granted access over lower priority sources.

Schemes such as round robin arbitration and first-come first-serve, although fair and relatively easy to implement, may result in unacceptable delays in granting access requests from these high priority sources. Accordingly, arbiters which favor efficiency over fairness often utilize a prioritization scheme in which sources are assigned relative priority values that are compared to determine which source gains access to the bus.

Priority schemes, however, generally suffer from the drawback that lower priority sources may be blocked from accessing the shared data bus for unacceptably long periods of time, particularly during periods of heavy data flow over the bus from higher priority sources. Furthermore, in an arbiter utilizing a prioritization scheme, a circuit having a large number of inputs is generally required to compare the priority values of all sources requesting access to the data bus.

As a consequence of the respective drawbacks of conventional fairness and priority based arbiters, choosing an appropriate arbitration protocol generally results in trade offs between fairness and efficiency.

SUMMARY OF THE INVENTION

It is an object of the present invention to provide a method of arbitrating access to a data bus shared among a plurality of competing sources which achieves fair and efficient bus utilization.

It is another object of the present invention to provide an arbitration device which controls access to a shared data bus in a manner which is both fair and efficient.

It is yet another object of the present invention to provide an arbitration device of reduced circuit size to compare priority values of competing sources which have requested access to a shared data bus.

It is still yet another object of the present invention to provide a method of arbitrating access to a data bus shared between a plurality of competing sources which requires fewer comparisons between priority values of competing sources which have requested access to the shared data bus.

The arbitration protocol of the present invention controls access to a shared data bus in a manner which ensures that the bus is utilized efficiently and that each competing source has a fair opportunity to access the bus. This is achieved by assigning each competing source an adjustable priority weighting value (PWV) which is initially set to a value which reflects the bandwidth requirements of the competing source ($CS_i$). During arbitration, the competing source with the lowest PWV is granted access to the bus. For each arbitration in which $CS_i$ is not granted bus access, $PWV_i$ is reduced by one so that the longer $CS_i$ is denied bus access, the greater the likelihood that $CS_i$ will be chosen. After $CS_i$ is granted access, $PWV_i$ is reset to its initial value.

The manner in which the present invention sets the initial PWV for a competing source $CS_i$ ensures fair and efficient prioritization. Each competing source $CS_i$ requires a certain time interval $T_i$ to prepare a standard data transfer unit (STDU) for transfer. This time interval $T_i$ depends on the bandwidth requirements of $CS_i$ since $T_i$ is the shortest time interval between successive requests for access to the data bus (i.e., the shortest request interval-SRI). The shared data bus requires a time interval $T_o$ to transfer a standard data transfer unit (SDTU). Accordingly, in the time interval $T_i$, the shared data bus can process $T_i/T_o$ data units. The present invention sets the initial PWV for $CS_i$ by calculating the ratio $T_i/T_o$. This initial value of PWV ensures that each competing source $CS_i$ which requests access to the bus will be granted access before $PWV_i$ becomes zero. In other words, within the shortest request interval (SRI) of $CS_i$, competing source $CS_i$ will be able to transfer data to the bus as long as the bandwidth of the shared bus is wide enough (i.e, at least greater than the sum of the bandwidths of the competing sources). This effectively guarantees that no competing source is blocked from accessing the bus, and that competing sources with relatively greater bandwidth requirements (i.e., smaller SRIs) are given priority.

The present invention further provides a fair and efficient arbitration protocol which requires reduced circuit size to compare the priority values of the competing sources which have requested access to the shared data bus. This reduced circuit size is achieved by using a multi-level arbitration scheme. Initially, competing sources are classified into competing source groups based on their bandwidth requirements so that competing sources having the same, or similar, bandwidth requirements are assigned to the same group. Each competing source group is assigned to a first level arbiter which may utilize conventional arbitration schemes such as round robin arbitration or first-come first-serve. During the first level of arbitration, each first level arbiter selects one competing source and sends a selected request signal to a second level arbiter.

After receiving the selected request signals from the first level arbiters, the second level arbiter utilizes the adjustable PWVs discussed above which are initially set to a value representing the ratio $T_i/T_o$. Because the second level arbiter only receives access requests for competing sources which have been selected by the first level arbiters, the second level arbiter compares fewer PWVs than the number of competing sources which have requested access to the shared data bus. Accordingly, the size of the circuit which performs PWV comparison in the second arbiter is reduced.

The objects of the present invention are achieved with a method for arbitrating access to a data bus shared among a plurality of competing sources which performs the steps of assigning each competing source $CS_i$ an initial priority weighting value (PWV) which relates to the bandwidth requirements of $CS_i$, receiving requests for access to the shared data bus from the competing sources, comparing the PWVs of the competing sources for which access requests have been received, granting bus access to one competing source based on the PWV comparison, and adjusting the PWV of each competing source $CS_i$ for which an access request was received based on whether or not $CS_i$ was granted bus access.

The objects of the present invention are further achieved by providing an apparatus for arbitrating access to a data bus shared among a plurality of competing sources, the apparatus including a device for assigning each competing source $CS_i$ an initial PWV based on the bandwidth requirements of $CS_i$, a device for receiving requests for access to the bus from the plurality of competing sources, a device for comparing the PWVs of the competing sources for which access requests have been received, a device for granting one competing source access to the bus based on the PWV comparison, and a device for adjusting the PWV of each competing source $CS_i$ for which an access request was received based on whether or not $CS_i$ was granted bus access.

The objects of the present invention are still further achieved by providing a method for arbitrating access to a data bus shared among a plurality of competing sources which performs the steps of assigning each competing source an initial PWV, classifying each competing source into one of a plurality of competing source groups, sending requests for access to the data bus from the grouped competing sources to first level arbiters, performing a first arbitration to select one competing source for each group and sending the results to a second arbiter, performing a second arbitration between the competing sources selected by the first arbiters based on a comparison of the PWVs of the selected competing sources, granting access to one competing source based on the comparison, and adjusting the PWV of each competing source $CS_i$ for which an access request was received based on whether on not $CS_i$ was granted access to the bus.

The objects of the present invention are still further achieved by providing a system for arbitrating access to a data bus shared among a plurality of competing sources, each having a corresponding adjustable PWV which is initially set to an initial PWV, the system including first level arbiters for receiving requests to access the bus from at least one competing source and outputting a signal selecting one competing source, and a second level arbiter for receiving the selected request signals from the first level arbiters, comparing the PWVs of the competing sources selected by the first level arbiters, granting access to one competing source based on the comparison, and adjusting the PWV of each competing source $CS_i$ for which an access request was received based on whether or not $CS_i$ was granted shared bus access.

Further scope and applicability of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF PREFERRED EMBODIMENTS

Figure 1:
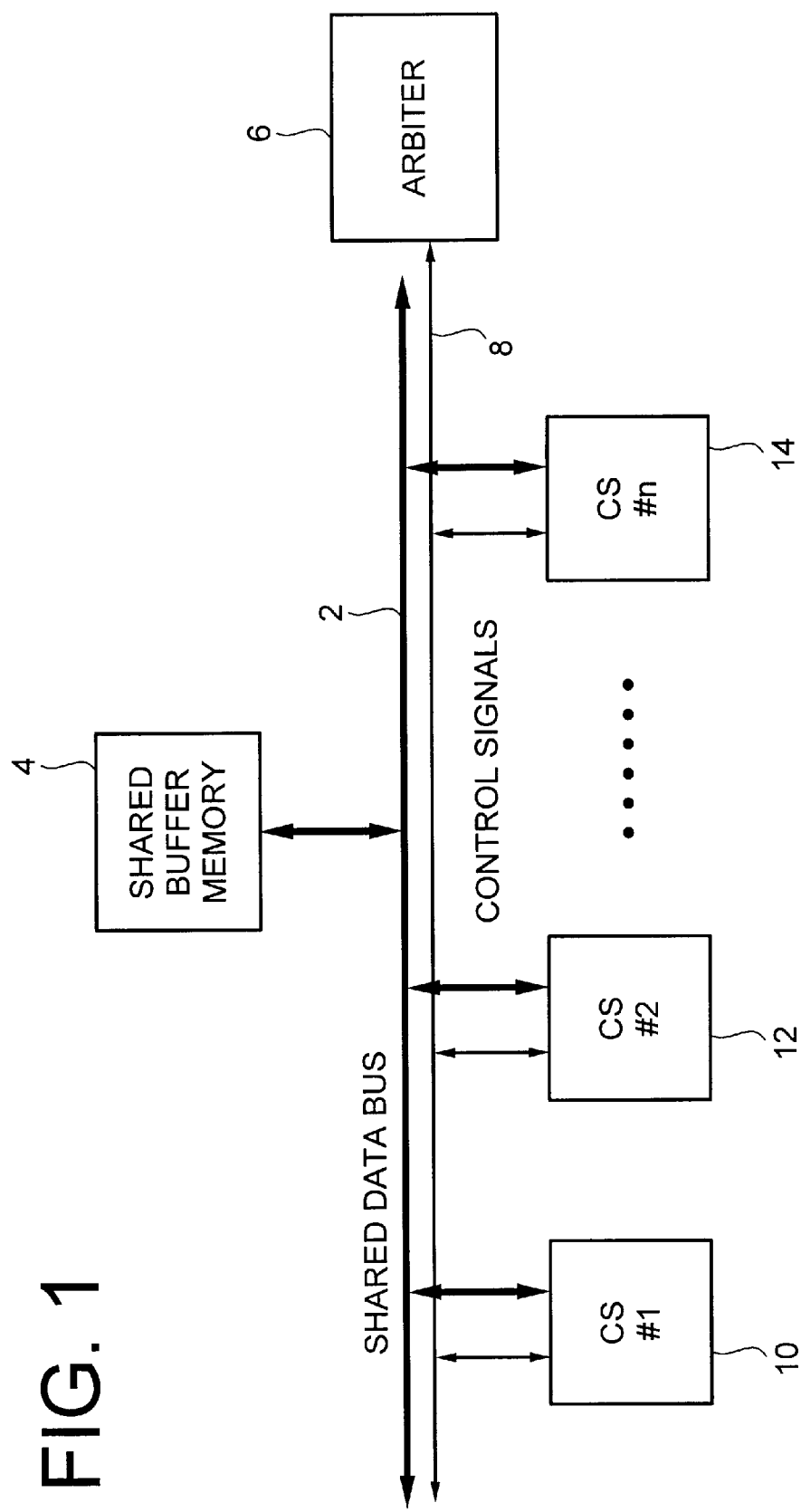
FIG. 1 is a block diagram illustrating a system of the present invention in which access to a bus shared by a plurality of competing sources is controlled by an arbiter.

Referring to FIG. 1, a data access system which requires an arbiter to control access to a shared data bus is seen. In the data access system, a plurality of competing sources 10, 12, and 14 which are labelled as CS #1, CS #2, . . . , CS #n, compete for access to data bus 2. Each of the competing sources 10, 12, and 14 is coupled to shared data bus 2 and is further coupled to control bus 8. Control bus 8 is coupled to arbiter 6. Shared buffer memory 4 is coupled to shared data bus 2.

Figure 2:
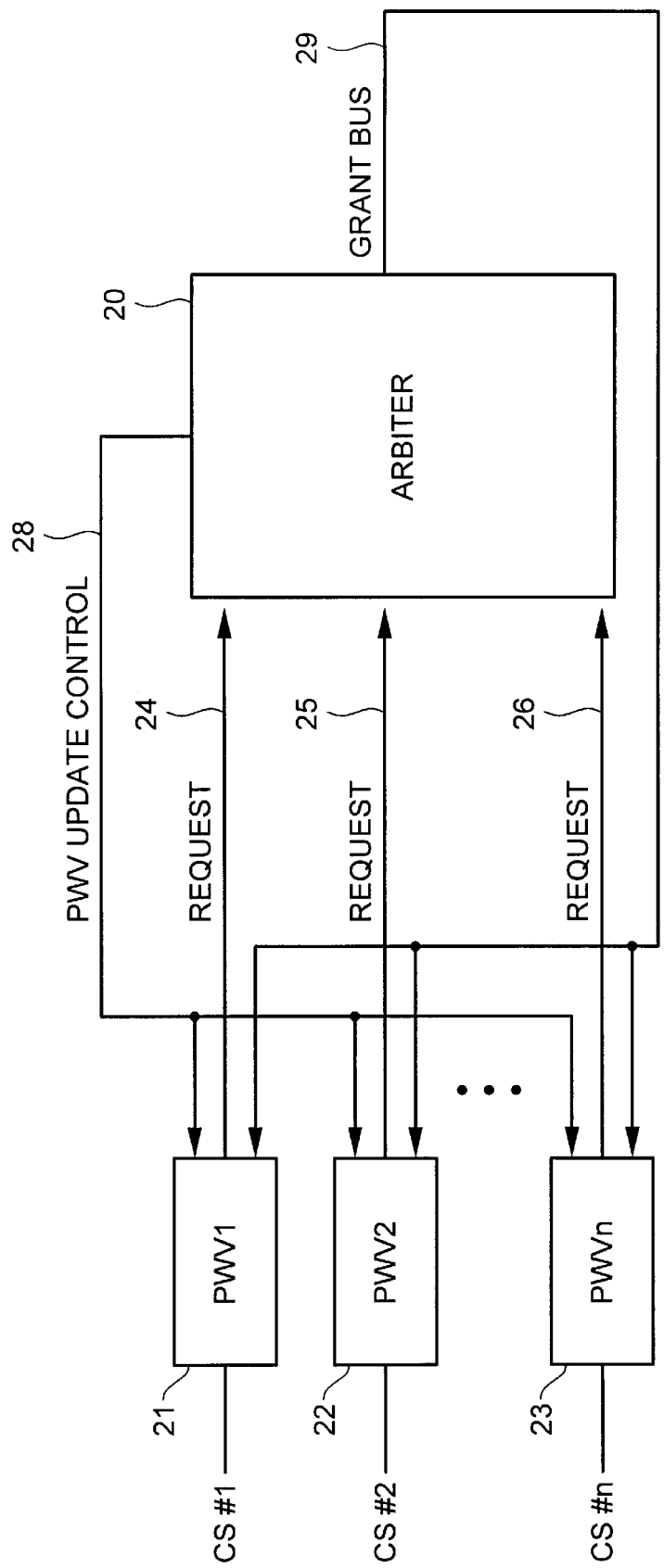
FIG. 2 is a block diagram illustrating the arbiter of the present invention.

Referring now to FIG. 2, an arbiter, which is applicable to the data access system of FIG. 1, is seen. A plurality of memory units including registers 21, 22, and 23 store priority weighting values PWV1, PWV2, . . . , PWVn. These priority weighting values PWV1, PWV2, . . . , PWVn respectively correspond to competing sources CS #1, CS #2, . . . , CS #n. These registers are included in their respective competing sources. Competing source CS #1 is coupled to arbiter 20 through request line 24. Competing source CS #2 is coupled to arbiter 20 through request line 25, and competing source CS #n is coupled to arbiter 20 through request line 26. All the competing sources CS #1, CS #2, and CS #3 are each also coupled to arbiter 20 through PWV update control line 28, and a grant bus 29 output from arbiter 20 indicating arbitration results.

The arbitration scheme of the present invention controls access to the shared data bus by comparing adjustable priority weighting values (PWVs) assigned to each competing source. Each competing source $CS_i$ is assigned an initial PWV which reflects the bandwidth requirements of $CS_i$. During arbitration, the PWVs of those competing sources which have requested access to the shared data bus are compared, and the competing source $CS_i$ with the smallest PWV is granted access to the shared data bus. After a competing source is granted access to the bus, the PWV of each competing source which requested access is adjusted for subsequent comparisons.

Figure 3:
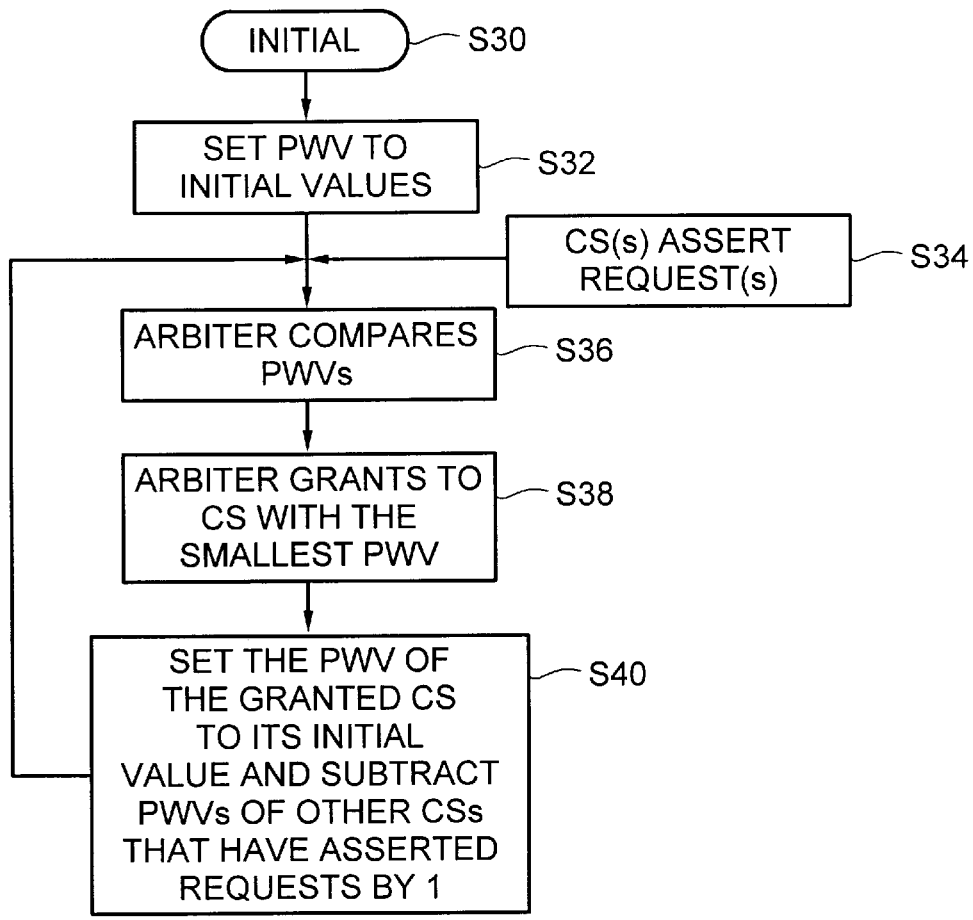
FIG. 3 is a flow chart illustrating the steps performed by the arbitration scheme of the present invention.

Referring now to FIG. 3, the steps performed in the arbitration scheme of the present invention are illustrated. After an initialization step S30, in PWV setting step S32, a priority weighting value (PWV) for each competing source $CS_i$ is set to an initial value. In access request step S34, a plurality of competing sources request access to the shared data bus. In comparison step S36, the PWVs of those competing sources which have requested access in step S34 are compared. In decision step S38, based on the comparison performed in step S36, the competing source with the smallest PWV is granted access to the shared data bus. In PWV adjustment step S40, the PWV of the competing source which was granted access in decision step S38 is reset to its initial value, and the PWV of each competing source which requested, but was denied, access to the data bus is reduced by one. After PWV adjustment step S40, steps S34 through S40 are repeated to allow subsequent bus access.

Figure 4:
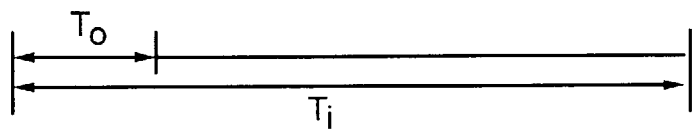
FIG. 4 illustrates the relationship between parameters used to control the arbitration scheme of the present invention.

FIG. 4 illustrates the relationship between parameters utilized to set the initial PWV for a competing source $CS_i$. Time interval $T_i$ represents the time required by a competing source $CS_i$ to prepare a standard data unit for transfer. Time interval $T_i$ thus represents the shortest time interval between successive requests for access to the data bus (i.e., Shortest Request Interval). Time interval $T_o$ represents the time required by the data bus to transfer a standard data transfer unit (SDTU). The initial PWV for a competing source $CS_i$ is computed in accordance with the formula:

$$PWV_i = \text{INTEGER}(T_i/T_o). \quad (1)$$

During time interval $T_i$, the shared data bus can process $T_i/T_o$ data units. When the bandwidth of the data bus is sufficiently wide (i.e., greater than the sum of the bandwidths of all competing sources), the adjustable PWV of the present invention, which is initially set in accordance with formula (1) and which is reduced each time bus access is denied, ensures that a competing source $CS_i$ will be granted access to the data bus before $PWV_i$ reaches zero. In other words, $CS_i$ will be able to transfer data over the data bus within the shortest request interval $T_i$. Therefore, utilizing the ratio of parameters illustrated in FIG. 4 to set the initial priority weighting value (PWV) ensures fair and efficient access to the shared data bus.

Figure 5:
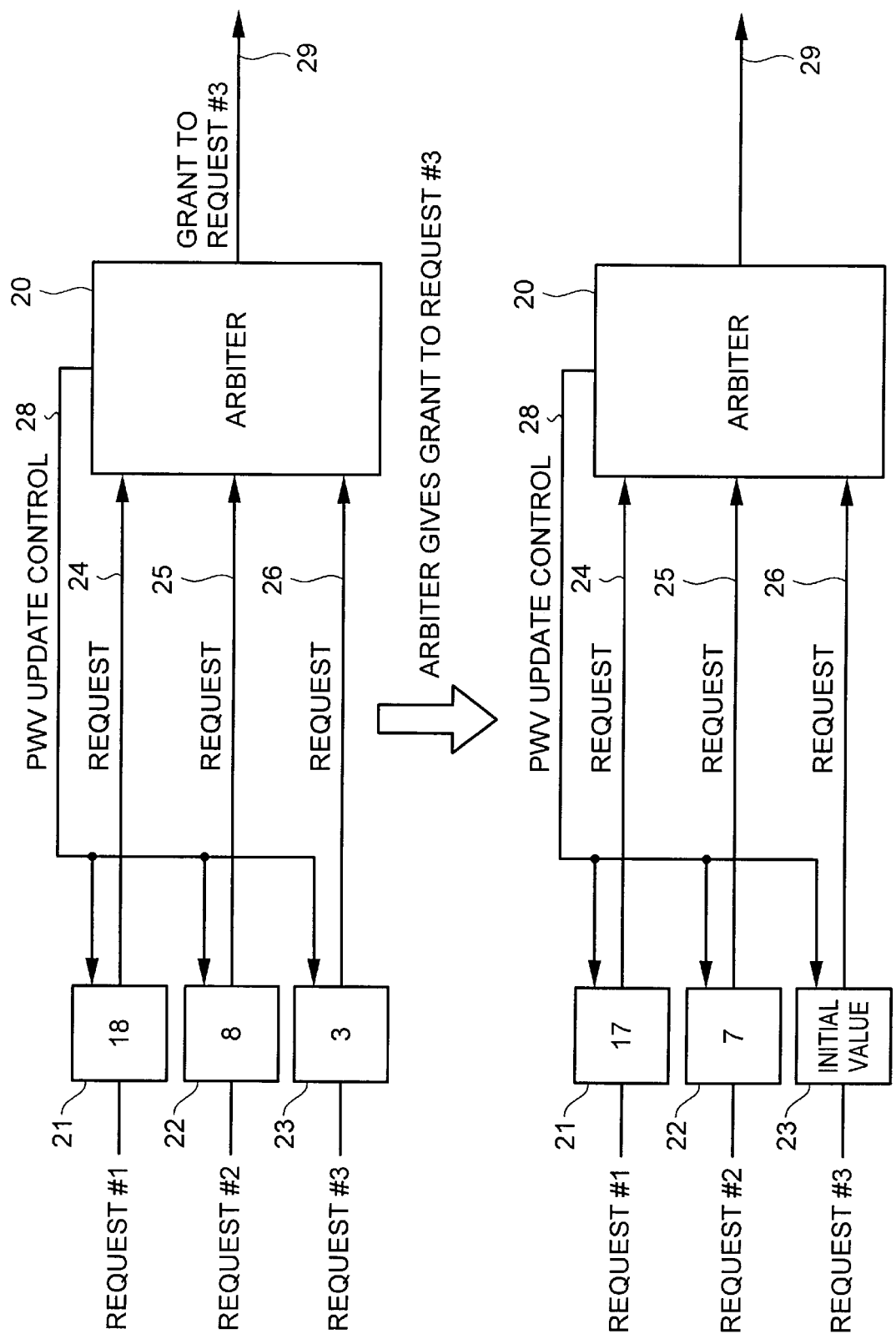
FIG. 5 illustrates an example of how the arbiter of the present invention operates.

FIG. 5 illustrates an example of an arbitration sequence performed by arbiter 20. As shown in FIG. 5, registers 21, 22, and 23 respectively store the PWVs for competing sources CS #1, CS #2, and CS #3 which have sent access requests to arbiter 20 through request lines 24, 25, and 26. The PWVs have previously been set to initial values by arbiter 20. Arbiter 20 compares the PWVs sent from registers 21, 22, and 23 to determine which PWV is the smallest. A signal indicating that the CS asserting request #3 has been granted, corresponding to a PWV of 3, is output by arbiter 20 on grant bus 29. Arbiter 20 additionally sends out update control signals on PWV update control line 28 to adjust the PWVs stored in registers 21, 22, and 23. As seen in FIG. 5, the PWV stored in register 23, corresponding to CS #3, is reset to its initial value because CS #3 was granted access to the bus. The PWVs stored in registers 21 and 22 are each reduced by one for the next comparison. During comparison by arbiter 20, if the smallest PWV is shared by more than one competing source, the competing source which has been waiting longer (i.e., the competing source with the larger initial PWV) is awarded access to the shared bus.

Figure 6:
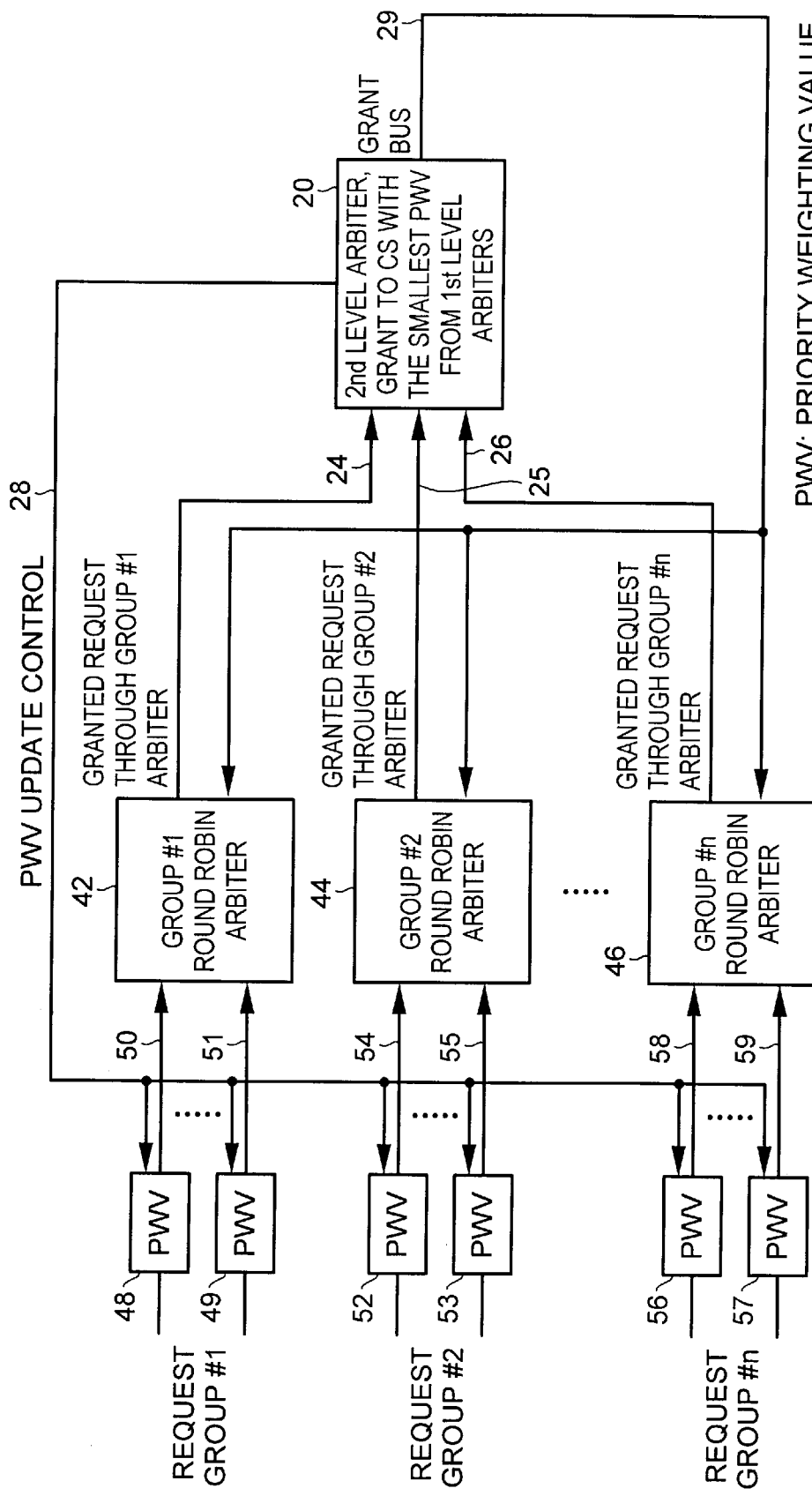
FIG. 6 illustrates a two level arbitration system of the present invention.

FIG. 6 illustrates a two-level arbitration system of the present invention. In this two level system, competing sources are classified into a plurality of groups including request group #1, request group #2, . . . , request group #n. PWV registers 48, . . . , 49 store adjustable PWVs for the competing sources in group #1 and are coupled to group #1 arbiter 42 through lines 50, . . . , 51. PWV registers 52, . . . , 53 store adjustable PWVs for the competing sources in group #2 and are coupled to group #2 arbiter 44 through lines 54, . . . , 55. PWV registers 56, . . . , 57 store adjustable PWVs for the competing sources in group #n and are coupled to group #n arbiter 46 through line 58, . . . , 59. First level arbiters (i.e., group #1 arbiter 42, group #2 arbiter 44, . . . , group #n arbiter 46) may utilize any of a number of arbitration schemes such as round-robin arbitration or first-come first-serve. The first level arbiters 42, 44, and 46 are coupled to second level arbiter 20 through request lines 24, 25, and 26 respectively. Second level arbiter 20 is coupled to each of PWV registers 48, 49, 52, 53, 56, and 57 through PWV update control line 28. Second level arbiter 20 outputs a grant signal on grant bus 29 indicating that access has been granted to a chosen competing source $CS_i$.

The two-level arbitration system illustrated in FIG. 6 operates as follows. Arbiter 20 assigns each competing source $CS_i$ an initial value of PWV in accordance with formula (1). Each competing source $CS_i$ is classified in a competing source group based on the initial value of PWV so that competing sources having the same, or similar, bandwidth requirements are classified in the same group. The adjustable PWVs are stored in PWV registers 48, 49, 52, 53, 56, and 57. Each competing source sends access requests to a corresponding first level arbiter. For example, access requests from the competing sources in group #1 are sent to group #1 arbiter 42. The first level arbiters 42, 44, and 46 each select one competing source from their corresponding groups based on, for example, round robin arbitration. The results of the first level arbitration are sent to second level arbiter 20 through request lines 24, 25, and 26. Second level arbiter compares the PWVs of the competing sources selected by the first level arbiters 42, 44, and 46, and grants access to the competing source with the smallest PWV. This result is output on grant bus 29 and the PWV for each $CS_i$ which requested access to the data bus is adjusted through PWV update control line 28 in a manner previously discussed (i.e., the PWV of the winning competing source is reset to its initial value and the PWV of each competing source which was denied access is reduced by one). It can be seen from FIG. 6 that the number of comparisons performed by second level arbiter 20 to determine the smallest PWV is less than the number of prioritized competing sources which requested access to the bus because the first level arbiters 42, 44, and 46 output only one access request from a group of competing sources. This two level system thus reduces circuit size for priority value comparison.

Figure 7:
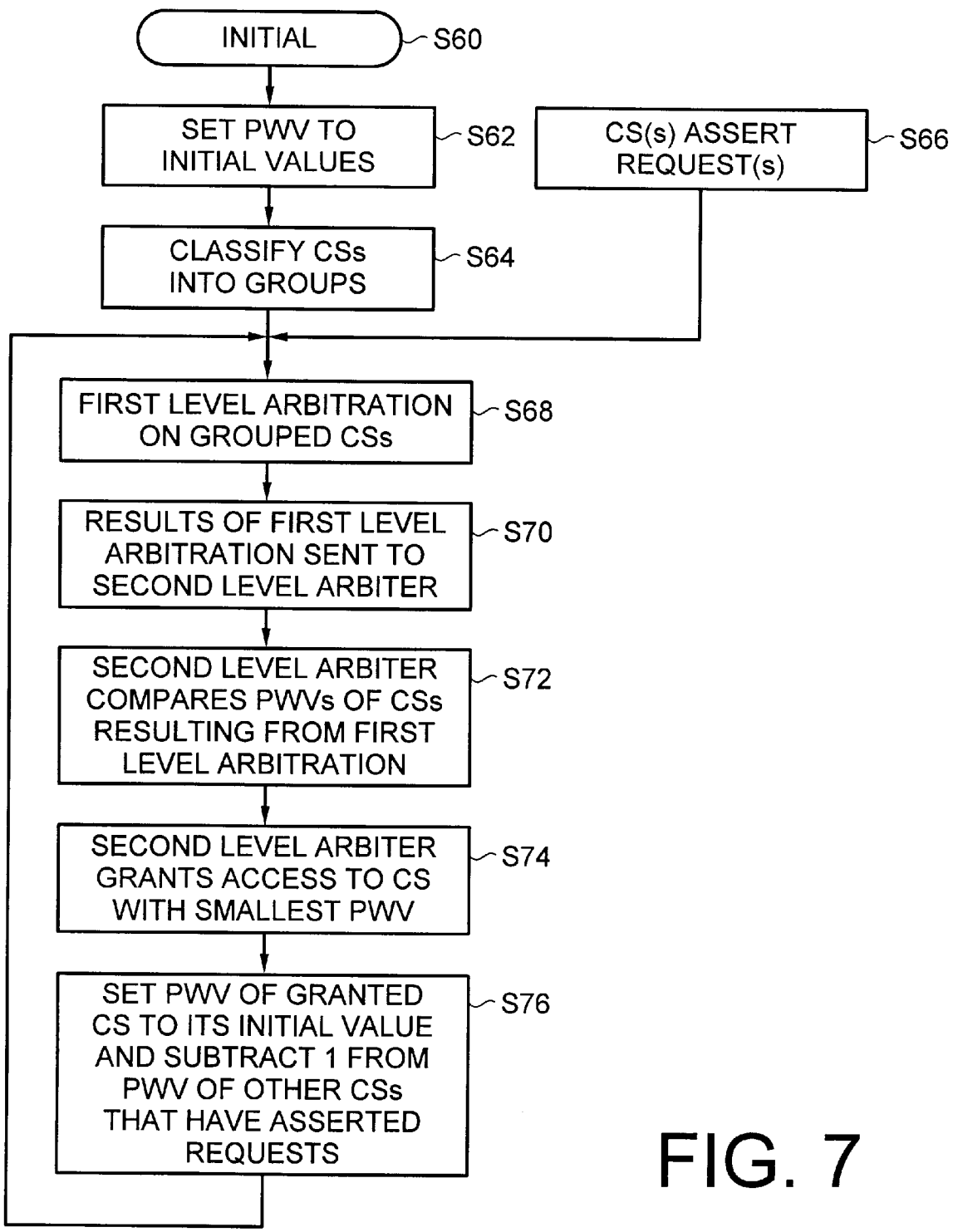
FIG. 7 is a flow chart illustrating the steps of the two-level arbitration of the present invention.

Referring now to FIG. 7, the steps performed by the two-level arbitration scheme of the present invention are illustrated. After an initialization step S60, in PWV setting step S62, a priority weighting value (PWV) for each competing source CS$_i$ is set to an initial value in accordance with formula (1). In grouping step S64, each competing source CS$_i$ is classified into a group based on the initial value of PWV$_i$. In access request step S66, a plurality of grouped competing sources request access to the shared data bus. In first arbitration step S68, first level arbitration is performed on the grouped competing sources so that one request is selected for each competing source group. In step S70, the access requests selected in first arbitration step S68 are sent to a second level arbiter. In comparison step S72, the PWVs of those competing sources selected in first arbitration step S68 are compared, and the competing source with the smallest PWV is granted access in decision step S74. In PWV adjustment step S76, the PWV of the competing source which was granted access in decision step S74 is reset to its initial value, and the PWV of each competing source which requested, but was denied, access to the data bus is reduced by one. After PWV adjustment step S76, steps S66 through S76 are repeated to allow subsequent bus access arbitration.

Figure 8:
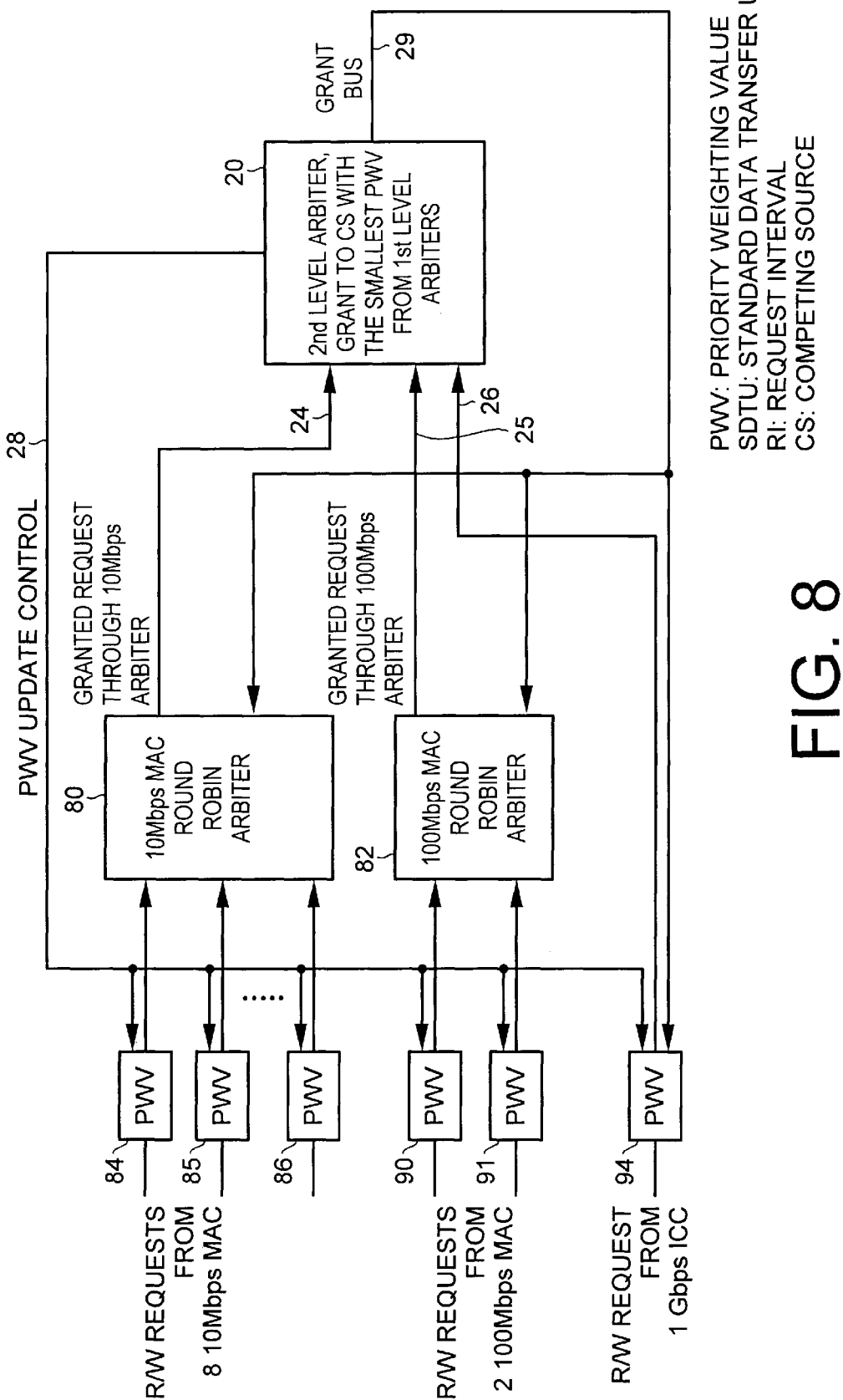
FIG. 8 illustrates an example of the two level arbitration system of the present invention.

FIG. 8 illustrates an example of a network in which the two level arbitration scheme of the present invention is incorporated. In this example, eight 10 Mbps MACs (Media Access Controllers) are classified into a first group, two 100 Mbps MACs are classified into a second group, and one 1 Gbps ICC (Inter-Chip Interface) is classified in a third group. PWV registers 84, 85, . . . , 86 store the adjustable PWVs for the 10 Mbps MACs of group 1, PWV registers 90 and 91 store the adjustable PWVs for the 100 Mbps MACs, and PWV register 94 stores the adjustable PWV for the 1 Gbps ICC. First level round robin arbiter 80 selects one 10 Mbps MAC from those requesting access to the bus based on round robin arbitration. First level arbiter 82 similarly selects one 100 Mbps MAC. Because there is only one 1 Gbps ICC in the third group, first level arbitration for this group will always select the same source. The results of first level arbitration are sent to second level arbiter 20 over request lines 24, 25, and 26, and second level arbiter compares the PWVs of the competing sources selected by first level arbitration. After the source with the smallest PWV is granted access to the shared data bus, the PWV of each competing source which requested access is adjusted in the manner discussed above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for arbitrating access to a data bus shared among a plurality of competing sources, said method comprising the steps of:
    (a) assigning each competing source an initial priority weighting value (PWV), the initial PWV for a competing source CS$_i$ being assigned based on the bandwidth requirements of CS$_i$, wherein the initial PWV for a competing source CS$_i$ is set in accordance with the formula;

$$PWV_i = \text{INTEGER } (T_i/T_o),$$

where T$_i$ represents the time interval required for competing source CS$_i$ to prepare a data unit for transfer and T$_o$ represents the time interval required for the data bus to transfer a data unit;
    (b) receiving requests for access to the shared data bus from the competing sources;
    (c) comparing the PWVs of the competing sources for which access requests have been received;
    (d) granting access to the shared data bus to one of the competing sources based on the result of said comparing step (c); and
    (e) adjusting the PWV of each competing source CS$_i$ for which a request was received in step (b) based on whether or not CS$_i$ was granted access to the shared data bus.

2. The method according to claim 1, wherein in step (e), the PWV for the competing source which was granted access in step (d) is set to its initial PWV, and the PWV for each competing source which was not granted access in step (d) is adjusted to a value indicating higher priority.

3. The method according to claim 1, wherein, when multiple competing sources have the same PWV, access to the shared data bus is granted to the competing source which has been waiting longer.

4. A device for arbitrating access to a data bus shared among a plurality of competing sources, said device comprising:
    means for assigning each competing source an initial priority weighting value (PWV), the initial PWV for a competing source CS$_i$ being assigned in accordance with the bandwidth requirements of CS$_i$, wherein the initial PWV for a competing source CS$_i$ is determined based on the formula;

$$PWV_i = \text{INTEGER } (T_i/T_o),$$

where T$_i$ represents the time interval required for competing source CS$_i$ to prepare a data unit for transfer, and T$_o$ represents the time interval required for the shared data bus to transfer a data unit;
    means for receiving request signals for access to the shared data bus from the plurality of competing sources;
    means for comparing the PWVs of the competing sources for which request signals have been received;
    means for granting access to the shared data bus to one of the competing sources based on the comparison result; and
    updating means for adjusting the PWV for each competing source CS$_i$ for which a request signal was received based on whether or not CS$_i$ was granted access to the shared data bus.

5. The device according to claim 4, wherein, when multiple competing sources have the same PWV, access to the shared data bus is granted to the competing source which has been waiting longer.

6. The device according to claim 4, wherein said updating means sets the PWV of the competing source which was granted access to the shared data bus to its initial value and adjusts the PWVs of competing sources which were not granted access to the shared data bus to a value indicating higher priority.

7. The device according to claim 4, wherein said device for arbitrating is incorporated in a data access system which includes a plurality of competing sources and a shared data bus.

8. A system for arbitrating access to data bus shared among a plurality of competing sources, each competing source having a corresponding priority weighting value (PWV) which is initially set to an initial PWV, said system comprising:

a plurality of first level arbiters, each receiving shared bus access requests from at least one competing source and outputting a signal selecting one competing source; and a second level arbiter for receiving the selection signals output by said plurality of first level arbiters, comparing the PWVs of the competing sources selected by said plurality of first level arbiters, granting access to one of the competing sources based on the comparison, and adjusting the PWV for each competing source $CS_i$ which requested access to the shared data bus based on whether or not $CS_i$ was granted access to the shared data bus, wherein the initial PWV for a competing source $CS_i$ is determined based on the formula;

$$PWV_i = \text{INTEGER}\ (T_i/T_o),$$

where $T_i$ represents the time interval required for competing source $CS_i$ to prepare a data unit for transfer, and $T_o$ represents the time interval required for the shared data bus to transfer a data unit.

9. The system according to claim 8, wherein said plurality of first level arbiters are round robin arbiters.

10. The system according to claim 8, wherein said plurality of first level arbiters are first come first serve arbiters.

11. The system according to claim 8, wherein each competing source $CS_i$ is classified into a group to determine which of said plurality of first level arbiters $CS_i$ transmits access requests to.

12. The system according to claim 11, wherein each competing source is classified into a group based on its required bandwidth so that competing sources having similar bandwidth characteristics are in the same group.

13. The system according to claim 8, wherein the initial PWV for a competing source $CS_i$ is set in accordance with the bandwidth requirements of $CS_i$.

14. A method for arbitrating access to a data bus shared among a plurality of competing sources, said method comprising the steps of:

(a) assigning each competing source an initial priority weighting value (PWV), wherein the initial PWV for a competing source $CS_i$ is determined based on the formula;

$$PWV_i = \text{INTEGER}\ (T_i/T_o),$$

where $T_i$ represents the time interval required for competing source $CS_i$ to prepare a data unit for transfer, and $T_o$ represents the time interval required for the shared data bus to transfer a data unit;

(b) classifying each competing source $CS_i$ into one of a plurality of competing source groups, each competing source group having at least one competing source corresponding thereto;

(c) sending requests for access to the shared data bus from the grouped competing sources to a plurality of first arbiters, each first arbiter receiving data bus access requests from a designated competing source group;

(d) performing a first arbitration in each of the first arbiters to select one competing source from each group and sending the results to a second arbiter;

(e) performing a second arbitration in the second arbiter based on a comparison between the PWVs for the competing sources selected in the first arbitration;

(f) granting access to the shared data bus to one of the plurality of competing sources as a result of the arbitration performed in step (e); and (g) adjusting the PWV of each competing source $CS_i$ which requested access to the shared data bus based on whether or not $CS_i$ was granted access to the shared data bus.

15. The method according to claim 14, wherein the PWV for the competing source granted access to the data bus in step (f) is set to its initial PWV in step (g) and the PWVs for the competing sources which were not granted access the shared data bus are adjusted to a value indicating higher priority.

16. The method according to claim 14, wherein the initial PWV for a competing source $CS_i$ is set in accordance with the bandwidth requirements of $CS_i$.

* * * * *